United States Patent
Zhang et al.

(10) Patent No.: US 11,843,760 B2
(45) Date of Patent: *Dec. 12, 2023

(54) TIMING MECHANISM TO DERIVE NON-CONTAMINATED VIDEO STREAM USING RGB-IR SENSOR WITH STRUCTURED LIGHT

(71) Applicant: Ambarella International LP, Santa Clara, CA (US)

(72) Inventors: Zhe Zhang, Shanghai (CN); Zhikan Yang, Shanghai (CN); Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/587,301

(22) Filed: Jan. 28, 2022

(65) Prior Publication Data

US 2022/0150462 A1    May 12, 2022

Related U.S. Application Data

(63) Continuation of application No. 17/014,117, filed on Sep. 8, 2020, now Pat. No. 11,323,685.

(30) Foreign Application Priority Data

Aug. 31, 2020 (CN) .......................... 202010895197.5

(51) Int. Cl.
*H04N 13/207* (2018.01)
*H04N 9/07* (2006.01)
(Continued)

(52) U.S. Cl.
CPC ............. *H04N 13/207* (2018.05); *H04N 5/33* (2013.01); *H04N 13/254* (2018.05);
(Continued)

(58) Field of Classification Search
CPC ..... H04N 13/207; H04N 13/257; H04N 23/12
(Continued)

(56) References Cited

U.S. PATENT DOCUMENTS

| | | | | |
|---|---|---|---|---|
| 2018/0131880 | A1* | 5/2018 | Hicks | G06V 10/145 |
| 2019/0297241 | A1* | 9/2019 | Kimura | G01B 11/026 |
| 2021/0110015 | A1* | 4/2021 | McCarty | G06F 21/32 |

* cited by examiner

*Primary Examiner* — Amir Shahnami
(74) *Attorney, Agent, or Firm* — Christopher P. Maiorana, PC

(57) ABSTRACT

An apparatus includes an interface circuit and a control circuit. The interface circuit may be configured to receive pixel data corresponding to a field of view of a camera. The control circuit may be configured to process the pixel data arranged as video frames and control an exposure time for capturing the pixel data and a turn on time of a structured light pattern to obtain a sequence of images comprising at least one image including the structured light pattern and at least one image where the structured light pattern is absent. The control circuit may be further configured to perform a depth analysis to generate depth information using the at least one image including the structured light pattern. The control circuit may store and execute an artificial neural network trained to (i) discern whether a face is at least one of a real face and a fake face, and (ii) make a liveness determination utilizing the depth information.

20 Claims, 10 Drawing Sheets

(51) Int. Cl.
*H04N 5/225* (2006.01)
*H04N 13/254* (2018.01)
*H04N 13/257* (2018.01)
*H04N 5/33* (2023.01)
*H04N 23/12* (2023.01)
*H04N 23/56* (2023.01)
*H04N 23/73* (2023.01)

(52) U.S. Cl.
CPC ........... *H04N 13/257* (2018.05); *H04N 23/12* (2023.01); *H04N 23/56* (2023.01); *H04N 23/73* (2023.01)

(58) Field of Classification Search
USPC .......................................................... 348/46
See application file for complete search history.

TIMING MECHANISM TO DERIVE NON-CONTAMINATED VIDEO STREAM USING RGB-IR SENSOR WITH STRUCTURED LIGHT

This application relates to U.S. patent application Ser. No. 17/014,117, filed Sep. 8, 2020, which relates to Chinese Application No. 202010895197.5, filed Aug. 31, 2020, which are hereby incorporated by reference in their entirety.

FIELD OF THE INVENTION

The invention relates to 3D sensing systems generally and, more particularly, to a method and/or apparatus for implementing a timing mechanism to derive a non-contaminated video stream using an RGB-IR sensor with structured light.

BACKGROUND

Conventional 3D sensing systems include two image sensors in order to acquire an infrared (IR) structured light pattern and an RGB image for liveness detection. It is possible to design a camera with a single RGB-IR sensor, however, the structured light pattern will contaminate the RGB image during sensor exposure, because the RGB-IR sensor includes both RGB and IR pixels, the RGB pixels will be affected by the IR pattern when structured light projector is turned on.

It would be desirable to implement a timing mechanism to derive a non-contaminated video stream using an RGB-IR sensor with structured light.

SUMMARY

The invention encompasses an aspect concerning an apparatus comprising an RGB-IR image sensor, a structured light projector, and a control circuit. The control circuit may be configured to control a shutter exposure time of the RGB-IR image sensor and a turn on time of the structured light projector to obtain a sequence of images captured by the RGB-IR image sensor, wherein the sequence of images comprises at least one image including a structured light pattern and at least one image where the structured light pattern is absent.

In some embodiments of the apparatus aspect described above, the control circuit may be further configured to generate a signal indicating which image in the sequence of images contains the structured light pattern.

In some embodiments of the apparatus aspect described above, the sequence of images comprises a plurality of groups, each group comprising one or more images including the structured light pattern and two or more images where the structured light pattern is absent.

In some embodiments of the apparatus aspect described above, the control circuit may be further configured to control one or more features of a security system in response to the sequence of images and the signal indicating which image in the sequence of images contains the structured light pattern. In some embodiments, the one or more features of the security system may comprise one or more of a door lock, an alarm system, a controlled access system, and a payment system.

In some embodiments of the apparatus aspect described above, the apparatus comprises a low power camera.

In some embodiments of the apparatus aspect described above, the control circuit may be further configured to perform one or more of depth information generation, liveness determination, and facial recognition. In some embodiments, the facial recognition comprises 3D facial recognition utilizing the depth information.

In some embodiments of the apparatus aspect described above, the structured light projector comprises an array of vertical-cavity surface-emitting lasers. In some embodiments where the structured light projector comprises an array of vertical-cavity surface-emitting lasers, the array of vertical-cavity surface-emitting lasers emits light having a wavelength in an 800 to 1000 nanometers range. In some embodiments where the structured light projector comprises an array of vertical-cavity surface-emitting lasers, the structured light projector further comprises a lens configured to decompose a laser light pattern from the array of vertical-cavity surface-emitting lasers to a dense dot pattern array.

In some embodiments of the apparatus aspect described above, the apparatus further comprises one or more of an infrared (IR) light source or a visible light source. In some embodiments comprising an infrared (IR) light source or a visible light source, the IR light source and said visible light source comprise one or more light emitting diodes.

The invention also encompasses an aspect concerning a method of implementing a low-cost structured light based 3D sensing system comprising setting an exposure time of an RGB-IR image sensor based on a predetermined value, controlling an on-time of a structured light projector, and capturing a sequence of images using the RGB-IR image sensor, where the sequence of images comprises at least one image including a structured light pattern and at least one image where the structured light pattern is absent.

In some embodiments of the method aspect described above, the on-time of the structured light projector is controlled by a timer.

In some embodiments of the method aspect described above, the method further comprises in a daytime mode, using one or more of color image data and infrared image data captured by the RGB-IR image sensor while the structured light projector is turned off for one or more of encoding, face detection, and face recognition.

In some embodiments of the method aspect described above, the method further comprises in a night mode, using infrared image data captured by the RGB-IR image sensor while the structured light projector is turned off for one or more of encoding, face detection, and face recognition.

In some embodiments of the method aspect described above, the method further comprises using infrared image data captured by the RGB-IR image sensor while the structured light projector is turned on to generate depth information for one or more of depth determination, liveness determination, and 3D face recognition.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
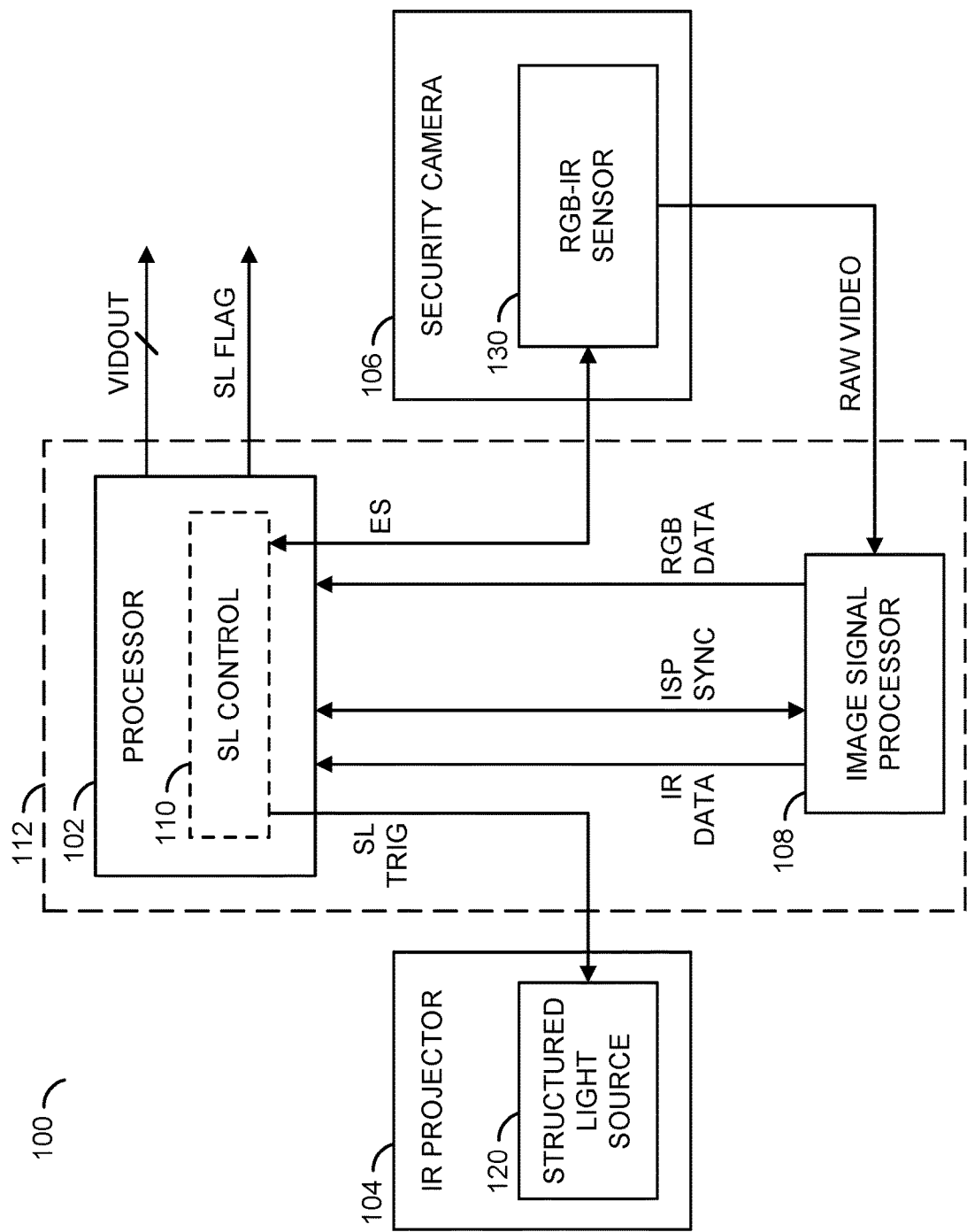
FIG. 1 is a diagram illustrating a monitoring system in accordance with an example embodiment of the invention.

Embodiments of the present invention include providing a timing mechanism to derive a non-contaminated video stream using an RGB-IR sensor with structured light that may (i) utilize a single RGB-IR image sensor to capture color and infrared images in day and night modes, (ii) ignore color image data captured while an infrared (IR) structure light source is turned on, (iii) provide optional IR and visible light sources for improved picture quality in night mode, (iv) provide programmability for sequences of images with and without a structured light pattern (SLP), (v) utilize IR image data with a structured light pattern to generate depth information for liveness determination and 3D facial recognition, (vi) utilize color and infrared images without a structured light pattern for face detection and recognition, and/or (vii) be implemented as one or more integrated circuits.

In various embodiments, a low cost 3D sensing platform may be provided. The low cost 3D sensing platform may facilitate development of intelligent access control systems and smart security products such as smart video doorbells and door locks, payment systems, alarm systems, etc. In various embodiments, the low cost 3D sensing platform may include a vision system on chip (SoC), a structured light projector, and a RGB-IR image sensor. In various embodiments, a single RGB-IR image sensor may be utilized to obtain both a visible light image and infrared (IR) light images with and without a structured light pattern. In various embodiments, the visible light image may be utilized in a day mode for viewing, object (e.g., face, etc.) detection, object identification, and/or facial recognition. The IR image without the structured light pattern may be utilized in a night mode for viewing, object (e.g., face, etc.) detection, object identification, and/or facial recognition. The IR image with the structured light pattern may be utilized in the day mode and the night mode for depth sensing and liveness determination.

In an example, the vision SoC may provide, inter alia, depth processing, anti-spoofing algorithms, structured light control, object detection/identification algorithms, facial detection/recognition algorithms, 3D facial detection/recognition algorithms, and video encoding on a single chip. In an example, the vision SoC may generate one or more control signals in response to analyzing images captured by the RGB-IR image sensor. In an example, the vision SoC may control one or more features of a security system (e.g., a door lock, an alarm system, a controlled access system, a payment system, etc.) using the one or more control signals. In an example, the vision SoC may be configured to store and execute artificial neural networks (ANNs) implementing feature detection and extraction, object detection and identification, facial detection and recognition, and liveness determination. In an example, the ANNs may be stored (e.g., in a non-volatile computer readable storage medium) as directed acyclic graphs (DAGs) and corresponding weights.

In various applications, a low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advance high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) algorithms for advanced features such as people counting and anti-tailgating.

Referring to FIG. 1, a block diagram of an apparatus is shown illustrating an example implementation of a sensing system in accordance with an example embodiment of the invention. In an example, a system 100 may implement a 3D sensing platform including a timing mechanism to derive a non-contaminated video stream using an RGB-IR sensor with structured light. In an example, the system 100 may comprise a block (or circuit) 102, a block (or circuit) 104, a block (or circuit) 106, and/or a block (or circuit) 108. The circuit 102 may be implemented as a control circuit (e.g., dedicated circuitry, embedded controller, processor, microprocessor, etc.). The circuit 104 may implement an infrared structured light projector. The circuit 106 may implement a security/surveillance camera (or module). The circuit 108 may implement an image signal processing (ISP) circuit (or processor or frontend). In an example, the circuit 108 is generally capable of performing multiple channel ISP.

In an example, the circuit 102 may include a block (or circuit) 110. The block 110 may implement a structured light (SL) control circuit (or function). In another example, the circuits 102 and 110 may be implemented as separate circuit cores than may be instantiated on a single integrated circuit substrate (or die) or in a multi chip module (MCM). In an example, the circuits 102 and 108 (and the circuit 110 when separate from the circuit 102) may be implemented in a single integrated circuit or system-on-chip (SOC) 112.

In various embodiments, the circuit 102 may be connected to the IR structured light projector 104, the camera 106, and the ISP circuit 108. The camera 106 may also be connected to the ISP circuit 108. In an example, the circuit 102 generally provides a central control mechanism to synchronize timing of the IR projector 104 and the camera 106. In an example, the circuit 102 may be configured to calculate and maintain a predefined timing model to control a structured light source 120 of the IR projector 104. In an example, the circuit 102 may be further configured to control an exposure time of an RGB-IR sensor 130 of the camera 106. In an example, the circuit 102 may be further configured to control the ISP circuit 108 for synchronization with the output of the camera 106. In various embodiments, the circuit 102 may be configured to generate one or more video output signals (e.g., VIDOUT) and a signal (e.g., SL FLAG). In an example, the signal SL FLAG may be used to indicate when the signal VIDOUT contains the structured light pattern.

In various embodiments, video output signals VIDOUT generated by the processor 102 may encode a variety of video streams for different purposes. In one example, RGB channel data without structured light pattern contamination may be used for face detection and facial recognition and/or live video feed in a day mode. In another example, IR channel data without structured light pattern contamination and without additional IR illumination may be used for face detection, facial recognition, and/or live video feed in the day mode. In yet another example, IR channel data without structured light pattern contamination and with additional IR illumination may be used for face detection, facial recognition, and/or live video feed in a night mode. In still another example, IR channel data with the structured light pattern and without additional IR illumination may be used for depth analysis and liveness determination in both the day mode and the night mode. RGB channel data with structured light pattern contamination may discarded.

In some embodiments, the circuit 106 may be configured to present a signal (e.g., ES). The signal ES may indicate (or provide information facilitating calculation using a predefined formula of) when the sensor 130 begins exposure. In one example, a flash pin of the rolling sensor 130 may be configured to generate the signal ES. In another example, other sensor signals from the circuit 106 may be used to calculate when the exposure starts (e.g., using a predefined formula, etc.). The signal ES from the circuit 106 may be utilized by the circuit 110 to control the circuit 104. In another example, the signal ES may be configured to generate an interrupt in response to the sensor 130 beginning exposure. The interrupt may cause the circuit 110 to start a predefined turn-on period of the structured light source 120 of the IR projector 104. In an example, the circuit 110 may be configured to program a timer with the predefined turn-on period. In response to receiving the signal ES, the circuit 110 may start the timer to turn on the structured light source for the predefined period of time.

In an example, the circuit 102 may have an input that may receive the signal ES, a first input/output that may communicate via a signal (e.g., ISP SYNC) with a first input/output of the circuit 108, a second input/output that may communicate a first image channel (e.g., RGB DATA) with a second input/output of the circuit 108, a third input/output that may communicate a second image channel (e.g., IR DATA) with a third input/output of the circuit 108, a first output that may present a signal (e.g., SL_TRIG), a second output that may present the one or more video output signals VIDOUT, and a third output that may present the signal SL FLAG. In an example, the circuit 104 may have an input that may receive the signal SL_TRIG. The circuit 104 may be configured to generate a structured-light pattern based on the signal SL_TRIG.

In an example, the circuit 106 may have an output that may present the signal ES (or another signal communicating information that can be used to calculate the start of an exposure) and an input/output that may communicate a signal (e.g., RAW VIDEO) to a fourth input/output of the circuit 108. In an example, the signal RAW VIDEO may communicate four channels (e.g., R, G, B, and IR) of video pixel information to the circuit 108. In an example, the circuits 106 and 108 may also exchange control and/or status signals via the connection carrying the signal RAW VIDEO.

In an example, the circuit 108 may be configured to split the four-channel RGB-IR video signal RAW VIDEO received from the circuit 106 into separate IR and RGB image data channels. In an example, the circuit 108 may be configured to generate the first image channel RGB DATA and the second image channel IR DATA in response to the signal RAW VIDEO. The first image channel RGB DATA generally comprises color image data. In an example, the color image data may comprise RGB or YUV color space data. In an example, the second image channel IR DATA may comprise monochrome image data. When the structured light pattern is projected by the circuit 104, the second image channel IR DATA generally comprises both IR image data and the structured light pattern projected by the circuit 104. When the structured light pattern is not projected by the circuit 104, the second image channel IR DATA generally comprises IR image data with no structured light pattern. When the structured light pattern is projected by the circuit 104, the first image channel RGB DATA generally comprises the structured light pattern projected by the circuit 104 also, and, therefore, is generally ignored.

In an example, the structured light pattern data carried by the second image channel IR DATA may be analyzed by the circuit 102 to obtain 3D (e.g., depth) information for the field of view of the camera 106. The circuit 102 may be further configured to make a liveness determination based upon the structured light pattern data carried by the second image channel IR DATA. In an example, the RGB (or YUV) data along with the IR data may be analyzed by the circuit 102 to discern (e.g., detect, identify, etc.) one or more features or objects in the field of view of the camera 106. In an example, the circuit 110 may be configured to generate the signal SL_TRIG. The circuit 110 may implement a structured light control timing protocol in accordance with embodiments of the invention. In an example, the circuit 110 may be implemented in hardware, software (or firmware, microcoding, etc.), or a combination of hardware and software.

In an example, the circuit 120 may be implemented as a structured light source. In an example, the circuit 120 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern. The lens is generally configured to decompose the laser light pattern to a dense dot pattern array. In an example, the circuit 120 may implement a near infrared (NIR) light source. In various embodiments, the light source of the circuit 120 may be configured to emit light with a wavelength of approximately 940 nanometers (nm), which is not visible to the human eye. However, other wavelengths may be utilized. In an example, a wavelength in a range of approximately 800-1000 nm may be utilized. In an example, the circuit 120 may be configured to emit the structured light pattern in response to the signal SL_TRIG. In an example, a period and/or intensity of the light emitted by the circuit 120 may be controlled (e.g., programmed) by the circuit 102. In an example, the circuit 102 may configure the circuit 120 prior to asserting the signal SL_TRIG.

In an example, the circuit 130 may be implemented with either a global shutter or a rolling shutter image sensor. When the circuit 130 is implemented with a global shutter image sensor, all pixels of the sensor may start exposure simultaneously. When the circuit 130 is implemented with a rolling shutter image sensor, as each line (or row) of the sensor starts exposure, all pixels in the line (or row) may start exposure simultaneously. In an example, the circuit 130 may be implemented with an RGB-IR image sensor. In an example, the RGB-IR image sensor may be implemented as an RGB-IR complementary metal oxide semiconductor (CMOS) image sensor.

In one example, the circuit 130 may be configured to assert the signal ES in response to starting an exposure. In another example, the circuit 130 may be configured to assert another signal that may be used to calculate the start of the exposure of the sensor using a predefined formula. In an example, the circuit 130 may be configured to generate the signal RAW VIDEO. In an example, the circuit 130 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. The red, green, and blue pixels may also receive (respond to) the longer infrared wavelengths due to hardware limitations. Hence, the infrared structured light pattern, when present, contaminates the RGB channel. Because of the structured light contamination, the RGB frames may be ignored generally when the infrared structured light pattern is present.

Figure 2:
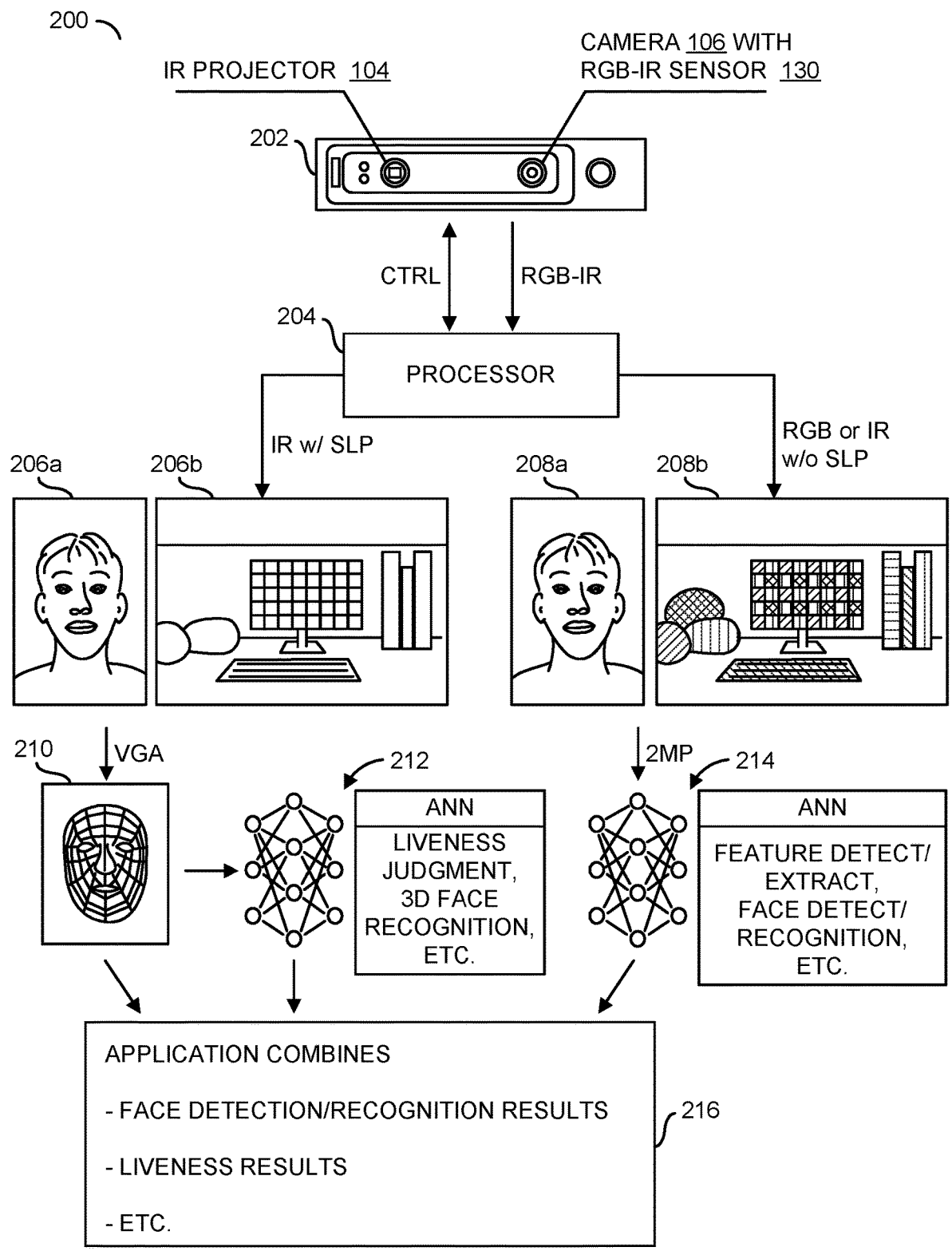
FIG. 2 is a diagram illustrating elements of a 3D sensing system in accordance with an example embodiment of the invention.

Referring to FIG. 2, a diagram is shown illustrating elements of a 3D sensing system in accordance with an example embodiment of the invention. In an example, a 3D sensing system 200 may include a housing 202 and a processor 204. The infrared (IR) structured light projector 104, including a first lens and the structured light source 120, and the camera 106, including a second lens and the single RGB-IR image sensor of the circuit 130, may be mounted in the housing 202. The IR structured light projector 104 may be configured, when turned on, to project a structured light pattern (SLP) on objects in the field of view of the camera 106. The RGB-IR sensor of the circuit 130 may be used to acquire both IR image data (with and without the structured light pattern) and RGB image data (without the structured light pattern) for the objects in the field of view of the camera 106. The 3D sensing system 200 generally provides advantages over conventional two camera sensing systems. By utilizing only one RGB+IR image sensor to obtain both RGB and IR image data with and without a structured light pattern (SLP), the 3D sensing system 200 generally reduces the system cost and the system complexity relative to conventional systems (e.g., one sensor and one lens versus two sensors and two lenses).

In an example, the processor 204 may separate (split) the RGB-IR data from the RGB-IR sensor of the circuit 130 into a first image data channel comprising IR image data with the structured light pattern present and a second image data channel comprising RGB and/or IR image data without the structured light pattern present. In an example, the first and second image data channels may be processed by the processor 204 for 3D (e.g., depth) perception, liveness determination, 3D facial recognition, object detection, face detection, object identification, and facial recognition. In an example, the first image data channel having the IR image data with the structured light pattern present may be used to perform depth analysis, liveness determination, and/or 3D facial recognition. The second image data channel, having the IR image data without the structured light pattern present and the RGB image data without the structured light pattern present, may be used to generate an encoded (or compressed) video signal, bitstream, or multiple bitstreams, and to perform object detection, face detection, object identification, and/or facial recognition.

In an example, a depth analysis 210 may be applied to the first image data channel, which comprises the IR image data with the structured light pattern present (e.g., when the IR projector 104 is turned on). The depth analysis 210 may be utilized to generate depth information. In an example, the depth information generated by the depth analysis 210 may be utilized to discern between an image 206a of a 3D face of a real person (real face) and an image 206b of a picture of a person on paper, a computer screen, a phone screen, etc. (fake face). The generated depth information may also be used to make liveness determinations and/or to perform 3D facial recognition.

In an example, the depth information generated by the depth analysis 210 may be presented as inputs to a neural network 212. In another example, the depth information generated by the depth analysis 210 may be presented as inputs to traditional image processing and/or image analysis techniques. In an example, the neural network 212 may be configured (e.g., by design, through a training process, etc.) to perform liveness judgment (e.g., 3D Face/Fake Face) and/or 3D face recognition in real time. In an example, the neural network 212 may utilize the depth information generated by the depth analysis 210 to identify features of an object or a real person in the image 208a for 3D recognition and distinguish the image 208b of a picture of an object or a person on paper, a computer screen, a phone screen, etc. as a fake face or object. The neural network 212 may also utilize the depth information generated by the depth analysis 210 to make liveness determinations (judgments).

In an example, both the IR image data without the structured light pattern (e.g., the IR projector 104 is turned off) and the RGB image data without the structured light pattern present (e.g., the IR projector 104 is turned off), provided by the second image data channel, may be used to generate an encoded bitstream or bitstreams and to perform object detection, face detection, object identification, and facial recognition. In an example, the IR image data without the structured light pattern (e.g., the IR projector 104 is turned off) and/or the RGB image data without the structured light pattern (e.g., the IR projector 104 is turned off) may be presented as inputs to a neural network 214. In another example, the IR image data without the structured light pattern (e.g., the IR projector 104 is turned off) and/or the RGB image data without the structured light pattern (e.g., the IR projector 104 is turned off) may be presented as inputs to traditional image processing and/or image analysis techniques.

In an example, the neural network 214 may be configured (e.g., by design, through a training process, etc.) to obtain detection, recognition, and/or classification results in real time. In an example, in a low light (or night) environment the neural network 214 may utilize the IR image data (without the structured light pattern) from the second image data channel to identify features of an object or a person in a monochrome image 208a or monochrome image 208b of a picture of an object or a person on paper, a computer screen, a phone screen, etc. In brighter (daytime) environments, the neural network 214 may utilize the RGB image data (without the structured light pattern) from the second image data channel to render inferences based upon a color image 208a of a real object or person or a color image 208b of a photograph, image on a computer, cell phone screen, etc.

In embodiments implementing the neural network 212 and/or the neural network 214, the neural networks 212 and 214 may comprise one or more neural network architectures including, but not limited to, a convolutional neural network (CNN), a deep-learning neural network (DNN), and/or a fully connected neural network. Neural networks, more properly referred to as "artificial" neural networks (ANNs), are computing systems made up of a number of simple, highly interconnected processing elements, which process information by respective dynamic state responses to external inputs. Neural networks are processing devices (algorithms or actual hardware) that are loosely modeled after the neuronal structure of a brain, but on much smaller scales. A large neural network may have hundreds or thousands of processing units.

Neural networks are typically organized in layers. The layers may comprise a number of interconnected nodes that perform an operation or activation function. Input data is presented to an input layer of the network, which communicates to one or more internal (or hidden) layers where the actual processing is performed via an arrangement of weighted connections. The process of determining the weights for the weighted connections of the neural network is typically referred to as training. The hidden layers connect to an output layer where the result of a prediction model implemented by the neural network is presented.

In various embodiments, one or more applications 216 may utilize, alone or in combination, results of the depth analysis 210, outputs of the neural network 212, and/or outputs of the neural network 214. In an example, the application(s) 216 may be run on the processor 204 or using distributed processing (e.g., cloud resources, etc.).

Figure 3:
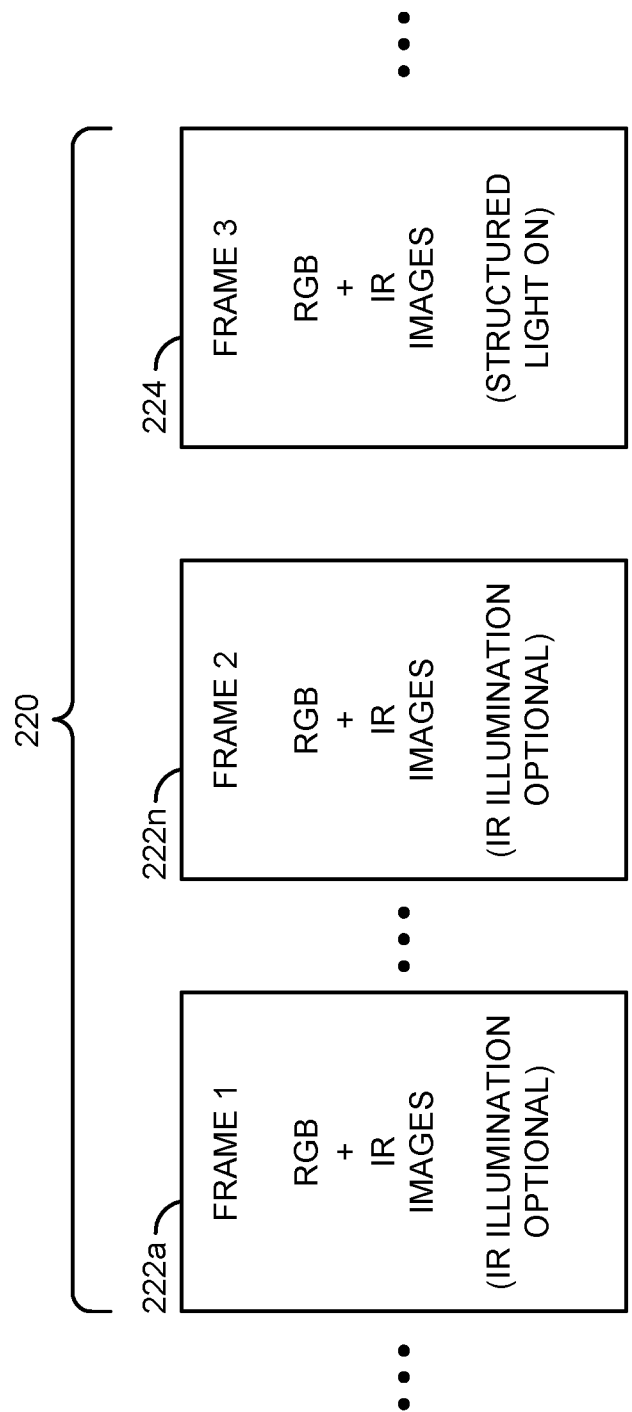
FIG. 3 is a diagram illustrating an example sequence of frames in accordance with an example embodiment of the invention.

Referring to FIG. 3, a diagram is shown illustrating a sequence of video frames in accordance with an embodiment of the invention. In an example, a portion 220 of a video sequence may comprise a number of frames 222a-222n and a frame 224. The frames 222a-222n may comprise color and/or IR image data without a structured light pattern. In an example, the frames 222a-222n may be captured with the IR projector 104 turned off. In an example, an optional IR light source (e.g., one or more IR LEDs) may be used with the frames 222a-222n in a night mode. In an example, the number of frames 222a-222n may be varied. In an example, the number of frames may be programmable by a user. The frame 224 may be captured with the IR projector 104 turned on.

In an example, the portion 220 may represent a group of frames that may be repeated. In an example, the video sequence may comprise a plurality of groups forming a pattern of frames with the structured light pattern and frames without the structured light pattern. In one example, a pattern may be 001001001 . . . , where 1 represents the presence of the structured light pattern. In other examples, the pattern may be 001100110011 . . . , 000110001100011 . . . , etc. In another example, a dynamic grouping scheme (e.g., 000100100001000101 . . . , etc.) may be implemented (e.g., when a face is detected).

When the IR projector 104 is turned off, the RGB data and the IR data may be used for encoding, face detection, face recognition, etc. When the IR projector 104 is turned on, the IR data with the structured light pattern may be used for depth determination, liveness determination and/or 3D face recognition. With the IR projector 104 turned on, the RGB channel is contaminated with the structured light pattern and, therefore, is generally ignored (dropped).

Figure 4:
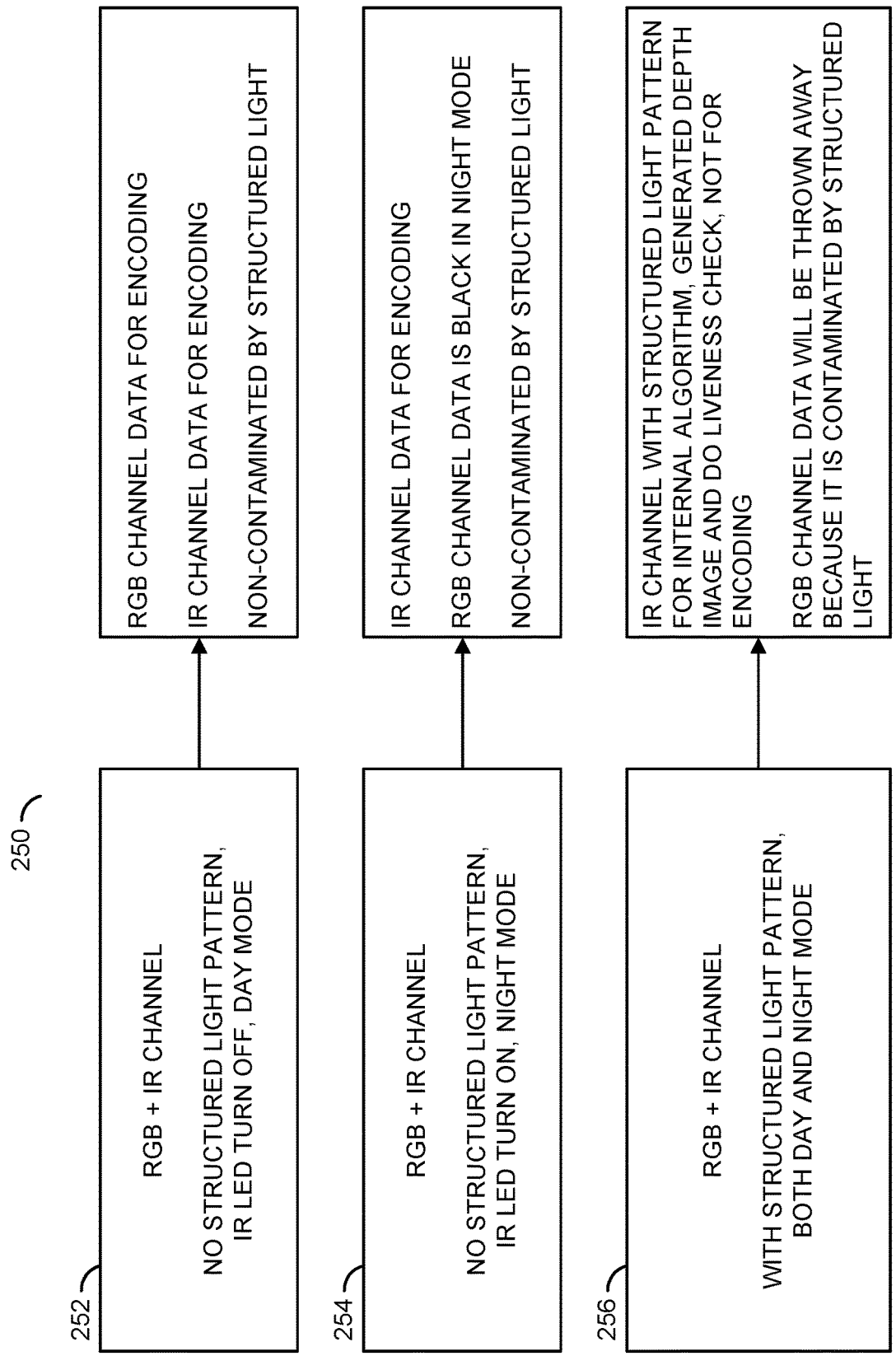
FIG. 4 is a diagram illustrating example outputs during day and night modes of operation.

Referring to FIG. 4, a diagram of a chart 250 is shown illustrating example outputs that may be generated during day and night modes of operation. In an example, during a day mode 252, the structured light projector and the optional IR LED illumination may be turned off. Both the RGB and IR image data channels may be used, alone or in combination, for generating an encoded bitstream, face detection, and facial recognition. In a night mode 254, the structured light projector may be turned off and the optional IR or visible light illumination may be turned on. In a depth and/or liveness sensing mode 256, the structured light projector may be turned on. The depth and/or liveness sensing mode 256 may be used in the day mode and the night mode.

In the night mode 254 with IR illumination turned on, the IR image data channel may be used for generating an encoded bitstream, face detection, and facial recognition, while the color (RGB or YUV) image data channel may be discarded (e.g., as too dark). In the night mode 254 with visible illumination turned on, the color (RGB or YUV) image data channel may be used for generating an encoded bitstream, face detection, and facial recognition. In the depth and/or liveness sensing mode 256, the color (RGB or YUV) image data channel may be discarded because of the contamination with the structured light pattern and the IR image data channel with the structured light pattern may be used, either internally (e.g., by the processor 102) or externally (e.g., by another circuit), to generate depth information and perform a liveness check or 3D face recognition. In the depth and/or liveness sensing mode 256, the IR image data channel is generally not used for encoding.

Figure 5:
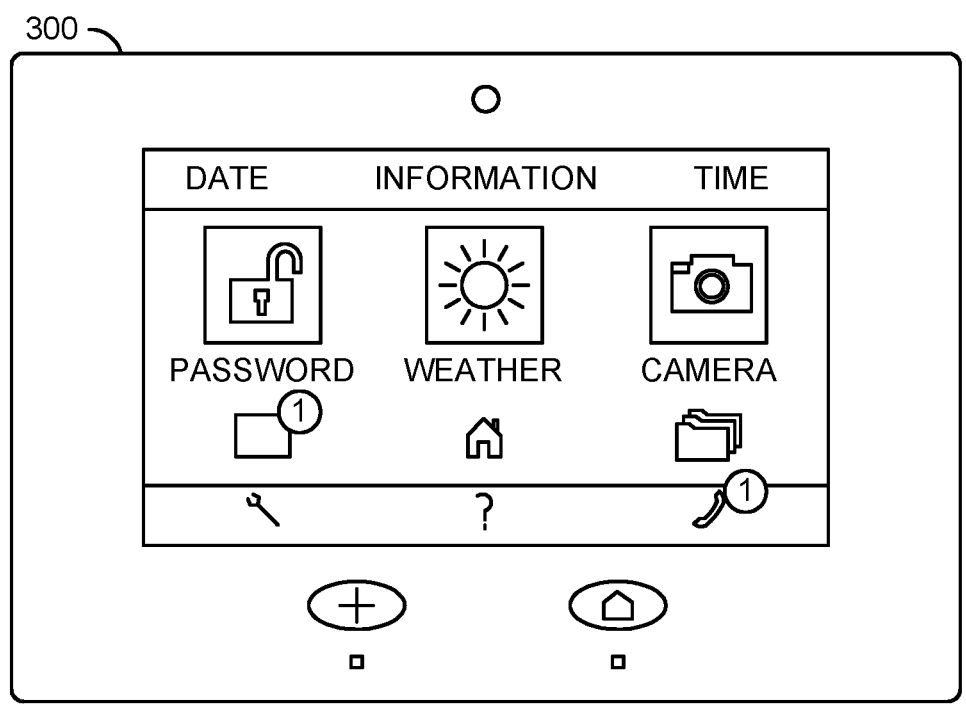
FIG. 5 is a diagram illustrating an example security panel providing a facial disarm feature.

Referring to FIG. 5, a diagram is shown illustrating an example security panel providing a facial disarm feature. In an example, a low cost 3D sensing system in accordance with an example embodiment of the invention may be implemented as part of a security panel 300. In an example, the security control panel 300 may be configured to limit access and/or permissions based on facial recognition. In an example, the 3D information may be used for 3D modeling and liveness determination and may be used to recognize particular users facially and automatically provide hands-free access (e.g., unlocking a door, disarming an alarm system, etc.). In an example, the 3D modeling and liveness determination may be used to recognize particular users and allow alarm system re-programming privileges based on facial identification (e.g., only person X or Y may be permitted to change access level or policy, add users, etc. even if the correct password is entered).

Figure 6:
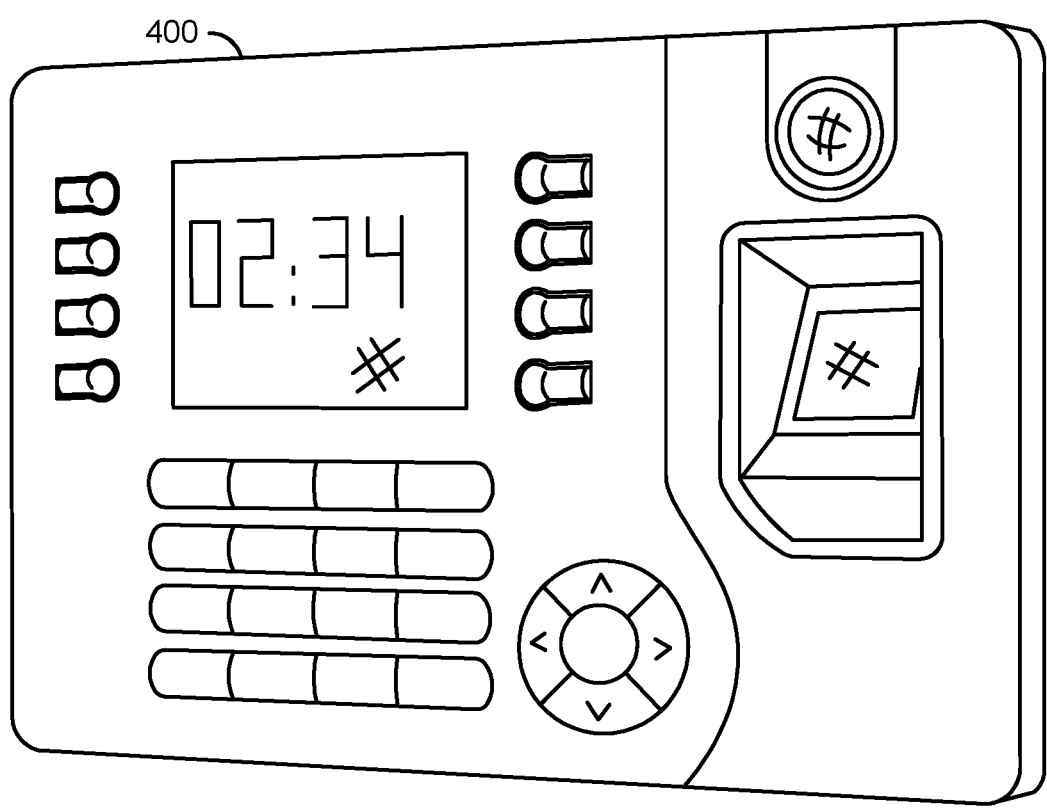
FIG. 6 is a diagram illustrating an example access control panel.

Referring to FIG. 6, a diagram is shown illustrating an example access control panel. In various embodiments, a low cost structured light based 3D sensing system comprising the apparatus 100 may be implemented as part of an access control panel 400. In an example, the 3D information may be used for 3D modeling and liveness determination. In an example, the low cost structured light based 3D sensing system may be used to gain access to a payment system (e.g., ATM, etc.), disarm an alarm system, and/or allow "tripwire" access to a restricted region (e.g., of a garden, a garage, a house, etc.). In one example, the low cost structured light based 3D sensing system may be configured to recognize a gardener/pool maintenance person and inhibit triggering an alarm. In another example, the low cost structured light based 3D sensing system may be configured to limit access to certain times and days of the week. In another example, the low cost structured light based 3D sensing system may be configured to allow alarm system re-programming privilege through the access control panel 400 based on video/audio identification (e.g., only person X or Y may be permitted to change access level or policy, add users, etc. even if the correct password is entered).

Figure 7:
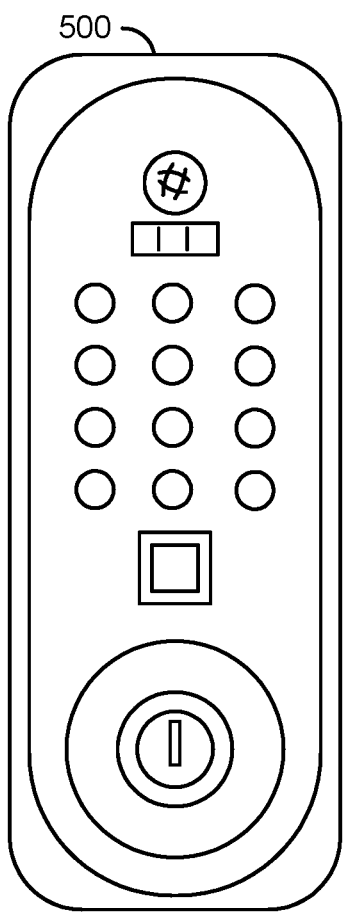
FIG. 7 is a diagram illustrating an example access control panel using a password.

Referring to FIG. 7, a diagram is shown illustrating an example access control panel using a password. In various embodiments, a low cost structured light based 3D sensing system comprising the apparatus 100 may be implemented as part of a security keypad 500. In an example, the security keypad 500 may be configured to limit access and/or permissions based on facial recognition. In an example, the 3D information may be used for 3D modeling and liveness determination and may be used to recognize particular users and allow access, alarm system disarm privileges, alarm system programming privileges, and/or alarm system re-programming privileges based on facial identification. In an example, only a known person (e.g., person X or Y) may be permitted to gain access or change access level or policy, add users, etc. even if the correct password is entered on the keypad 500.

Figure 8:
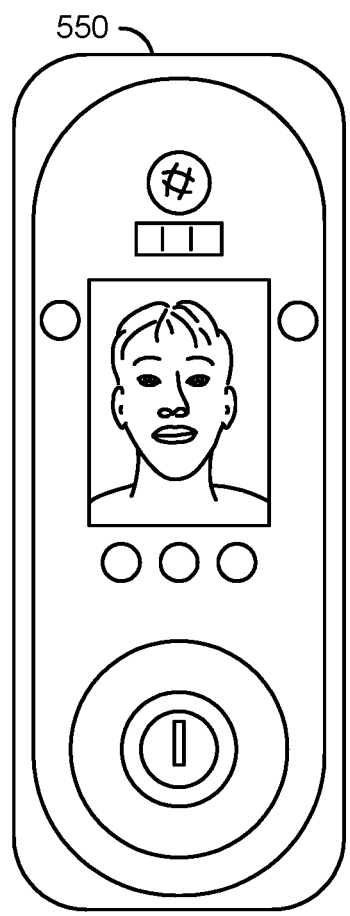
FIG. 8 is a diagram illustrating an example access control panel using a facial recognition.

Referring to FIG. 8, a diagram is shown illustrating another example access control panel 550 that may utilize the apparatus 100 for facial recognition.

Figure 9:
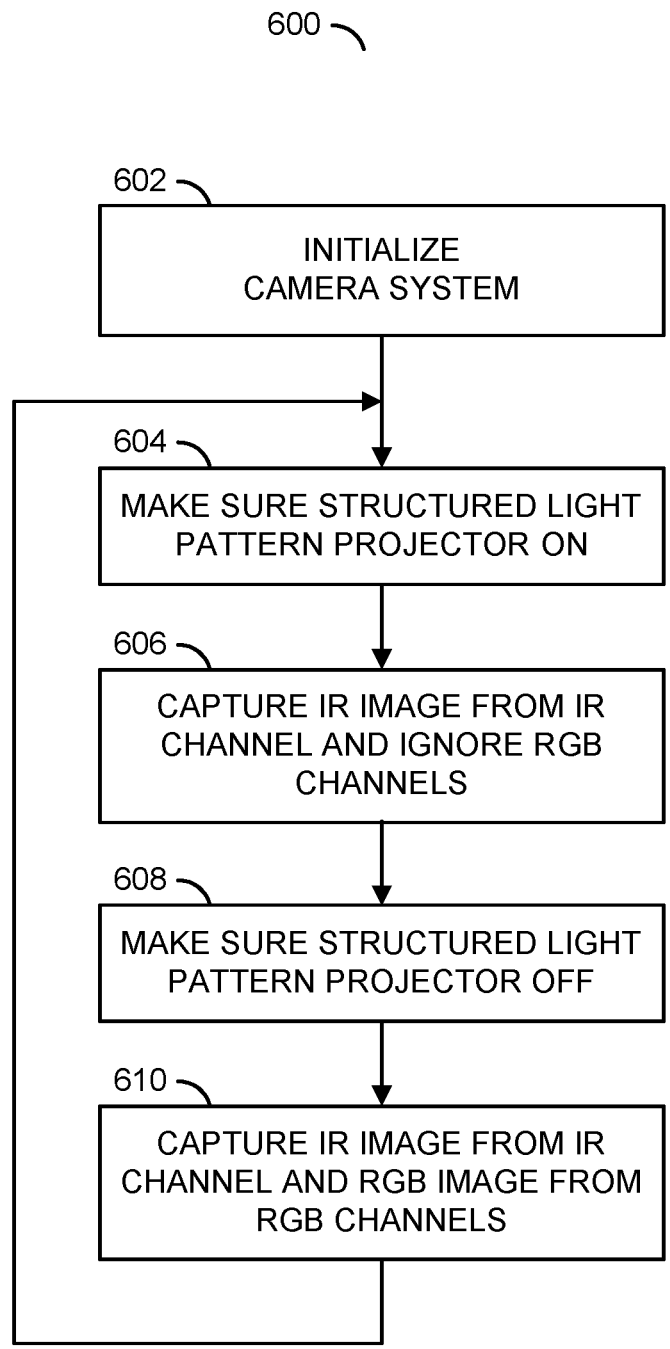
FIG. 9 is a flow diagram illustrating an example process in accordance with an example embodiment of the invention.

Referring to FIG. 9, a flow diagram is shown illustrating an example process that may be performed using the apparatus of FIG. 1. In an example, a process (or method) 600 may be implemented to generate a series (or sequence) of images for use in performing, inter alia, depth analysis, liveness determination, object detection, face detection, object identification, and/or facial recognition. In an example, the process 600 may comprise a step (or state) 602, a decision step (or state) 604, a step (or state) 606, a step (or state) 608, and a step (or state) 610. In the step 602, the process 600 may initialize a 3D sensing system (e.g., the system 100). In the step 604, the process 600 may make sure the structured light projector is turned on. In the step 606, the process 600 may obtain (capture) image data using an RGB-IR image sensor. The captured image data may include an infrared (IR) image data channel and a color (RGB or YUV) image data channel, both containing a structured light pattern projected by the structured light projector. A frame of image data from the infrared (IR) image data channel with the structured light pattern may be captured for use in depth analysis, liveness determination, and/or 3D face detection/recognition. The image data from the color (RGB or YUV) image data channel may be ignored (dropped) due to contamination with the structured light pattern.

In the step 608, the process 600 may make sure the structured light projector is turned off. In the step 610, the process 600 may obtain (capture) one or more images without the structure light pattern by capturing one or more frames of image data from both the IR image data channel and the color image data channel. The process 600 may repeat the steps 604 through 610 continuously or for a predetermined period of time to obtain a series (or sequence) of images. In an example, the images captured in the step 606 may be used to perform depth determinations, liveness determinations, and 3D face detection/recognition. In an example, the images captured in the step 610 may be used to perform encoding and object detection and identification including, but not limited to, face detection and facial recognition. In an example, the image data from the color (RGB or YUV) image data channel may be used in a day mode and image data from the IR image data channel may be used in a night mode. In an example, an optional IR light source (e.g., one or more light emitting diodes (LEDs)) may be used to provide additional illumination in the night mode. In another example, a visible light source (e.g., white LED(s)) may be used for night mode and the image data from the color (RGB or YUV) image data channel used for face detection and face recognition.

Figure 10:
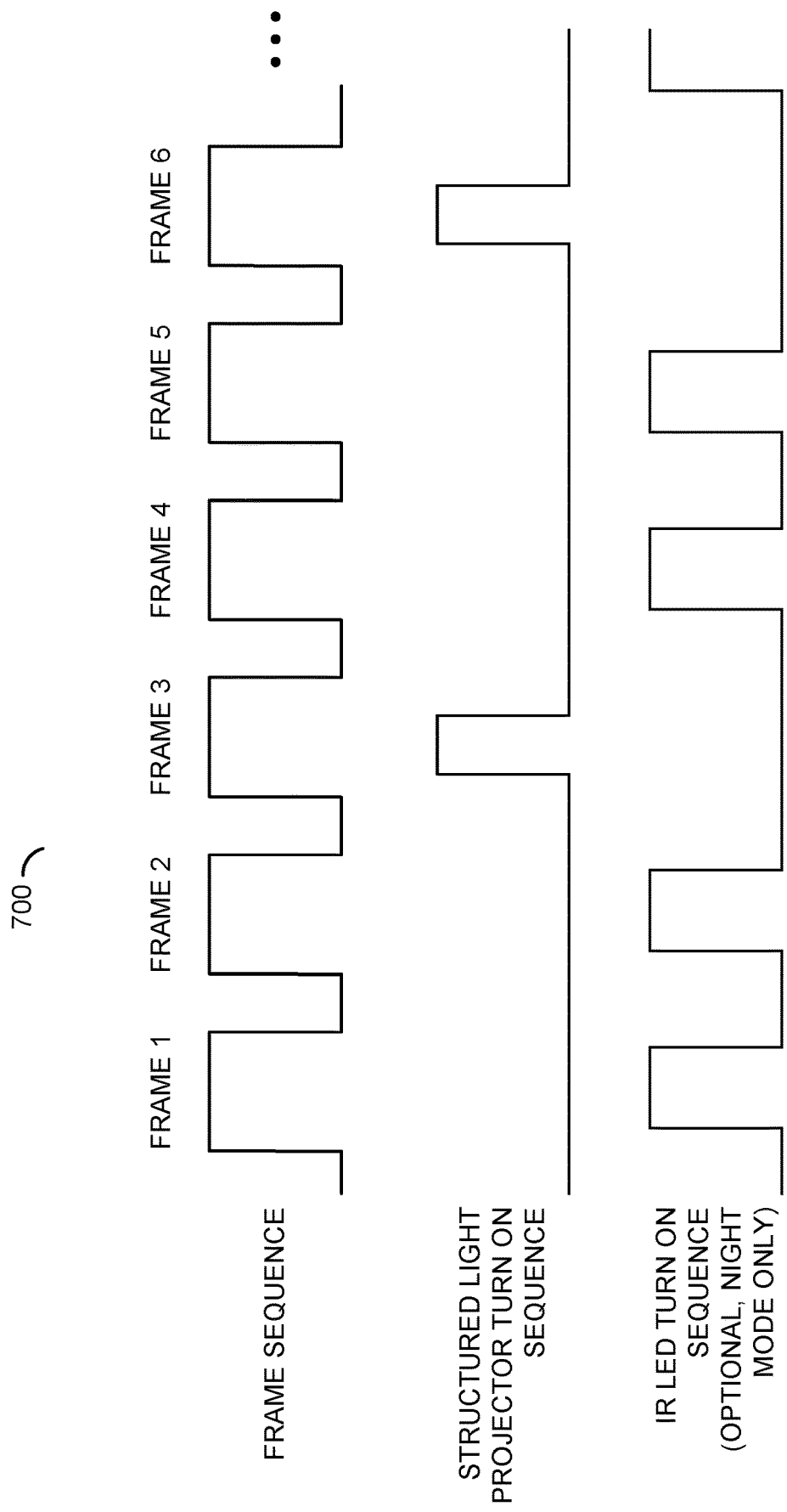
FIG. 10 is a timing diagram illustrating an example operation of the sensor system of FIG. 1.

Referring to FIG. 10, a timing diagram 700 is shown illustrating an example operation of the sensor system of FIG. 1. In an example, a portion of a video (or frame) sequence comprising 6 frames is shown. In frames 1, 2, 4, and 5, both the color (RGB or YUV) image data channel and the IR image data channel are uncontaminated (e.g., no structured light pattern present). Both the color (RGB or YUV) image data channel and the IR image data channel may be used for encoding purposes. In an example, a video bitstream may be generated by encoding the color (RGB or YUV) image data channel during a day mode and encoding the IR image data channel during a night mode. In an example, an optional IR or white LED illumination may be turned on during the night mode to improve image quality.

In frames 3 and 6, the structured light projector is turned on. Both the color (RGB or YUV) image data channel and the IR image data channel of frames 3 and 6 contain the structured light pattern. In various embodiments, only the IR image data channel with the structured light pattern is used; the color (RGB or YUV) image data channel with the structured light pattern may be discarded (dropped) because of the contamination of the structured light.

In the example shown in FIG. 10, the ratio of non-contaminated frames to contaminated frames is 2:1. However, other ratios (e.g., 3:1, 4:1, etc.) may be implemented. The ratio may be programmed based on a particular application. In an example, a ratio of 2:0 or 3:0 may even be used. For example, when no face is detected, the structured light does not need to be turned on.

Figure 11:
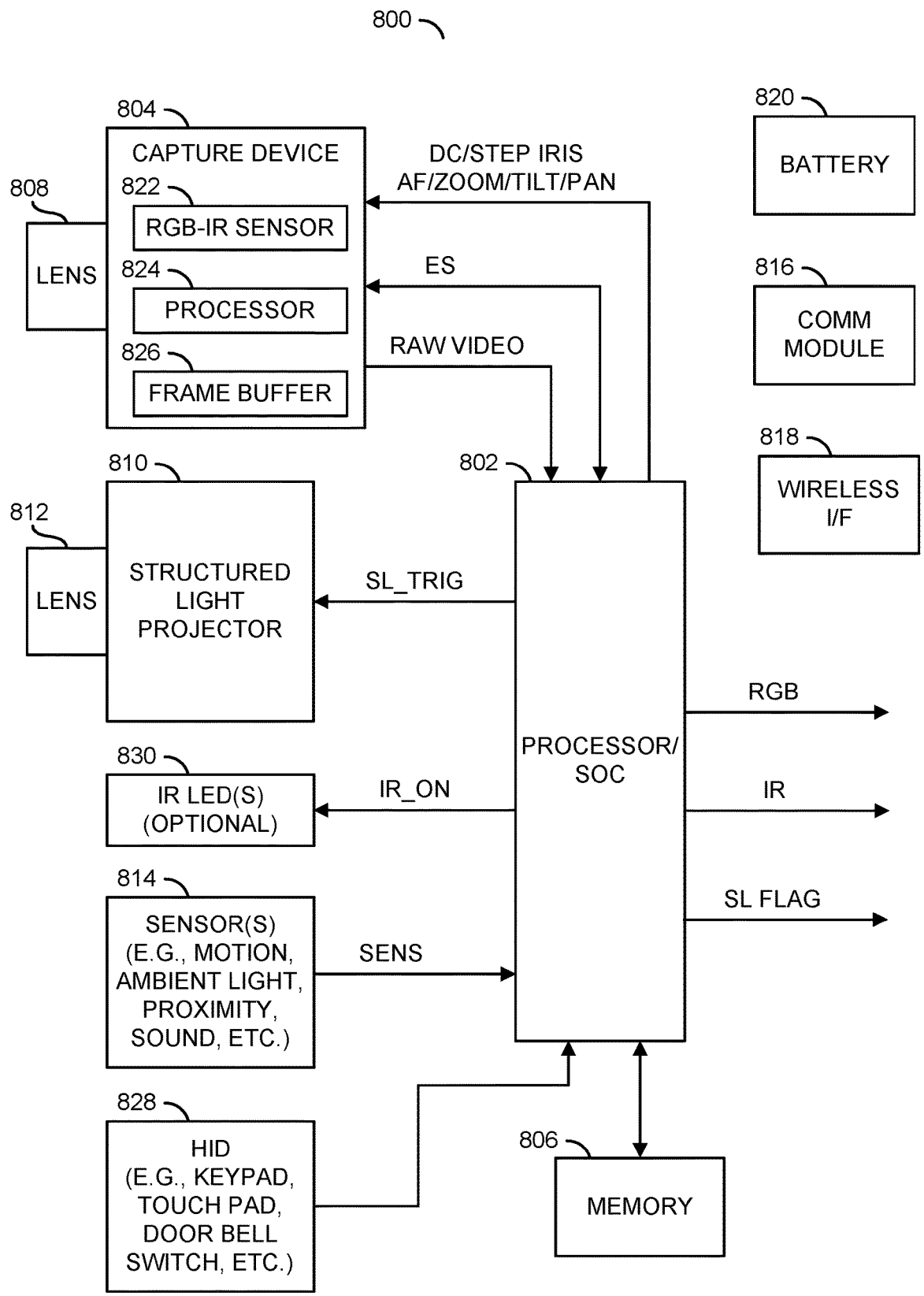
FIG. 11 is a diagram illustrating an apparatus in accordance with another example embodiment of the invention.

Referring to FIG. 11, a block diagram of a camera 800 is shown illustrating an example implementation. In an example, the camera 800 may comprise a block (or circuit) 802, a block (or circuit) 804, a block (or circuit) 806, a block (or circuit) 808, a block (or circuit) 810, a block (or circuit) 812, a block (or circuit) 814, a block (or circuit) 816, a block (or circuit) 818, and/or a block (or circuit) 820. The circuit 802 may be implemented as a processor and/or System on Chip (SoC). The circuit 804 may be implemented as a capture device. The circuit 806 may be implemented as a memory. The block 808 may be implemented as an optical lens. The circuit 810 may be implemented as a structured light projector. The block 812 may be implemented as a structured light pattern lens. The circuit 814 may be implemented as one or more sensors. The circuit 816 may be implemented as a communication device. The circuit 818 may be implemented as a wireless interface. The circuit 820 may be implemented as a battery 820. In some embodiments, the camera 800 may comprise the processor/SoC 802, the capture device 804, the memory 806, the lens 808, the IR structured light projector 810, the lens 812, the sensors 814, the communication module 816, the wireless interface 818, and the battery 820. In another example, the camera 800 may comprise the capture device 804, the lens 808, the IR structured light projector 810, the lens 812, and the sensors 814, and the processor/SoC 802, the memory 806, the communication module 816, the wireless interface 818, and the battery 820 may be components of a separate device. The implementation of the camera 800 may be varied according to the design criteria of a particular implementation.

The lens 808 may be attached to the capture device 804. In an example, the capture device 804 may comprise a block (or circuit) 822, a block (or circuit) 824, and a block (or circuit) 826. The circuit 822 may implement an image sensor. In an example, the image sensor of the circuit 822 may be an RGB-IR image sensor. The circuit 824 may be a processor and/or logic. The circuit 826 may be a memory circuit (e.g., a frame buffer).

The capture device 804 may be configured to capture video image data (e.g., light collected and focused by the lens 808). The capture device 804 may capture data received through the lens 808 to generate a video bitstream (e.g., a sequence of video frames). In various embodiments, the lens 808 may be implemented as a fixed focus lens. A fixed focus lens generally facilitates smaller size and low power. In an example, a fixed focus lens may be used in battery powered, doorbell, and other low power camera applications. In some embodiments, the lens 808 may be directed, tilted, panned, zoomed and/or rotated to capture the environment surrounding the camera 800 (e.g., capture data from the field of view). In an example, professional camera models may be implemented with an active lens system for enhanced functionality, remote control, etc.

The capture device 804 may transform the received light into a digital data stream. In some embodiments, the capture device 804 may perform an analog to digital conversion. For example, the image sensor 822 may perform a photoelectric conversion of the light received by the lens 808. The processor/logic 824 may transform the digital data stream into a video data stream (or bitstream), a video file, and/or a number of video frames. In an example, the capture device 804 may present the video data as a digital video signal (e.g., RAW VIDEO). The digital video signal may comprise the video frames (e.g., sequential digital images and/or audio).

The video data captured by the capture device 804 may be represented as a signal/bitstream/data communicated by the digital video signal RAW VIDEO. The capture device 804 may present the signal VIDEO to the processor/SoC 802. The signal RAW VIDEO may represent the video frames/video data. The signal RAW VIDEO may be a video stream captured by the capture device 804.

The image sensor 822 may receive light from the lens 808 and transform the light into digital data (e.g., the bitstream). For example, the image sensor 822 may perform a photoelectric conversion of the light from the lens 808. In some embodiments, the image sensor 822 may have extra margins that are not used as part of the image output. In some embodiments, the image sensor 822 may not have extra margins. In various embodiments, the image sensor 822 may be configured to generate an RGB-IR video signal. In an infrared light only illuminated field of view, the image sensor 822 may generate a monochrome (B/W) video signal. In a field of view illuminated by both IR light and visible light, the image sensor 822 may be configured to generate color information in addition to the monochrome video signal. In various embodiments, the image sensor 822 may be configured to generate a video signal in response to visible and/or infrared (IR) light.

The processor/logic 824 may transform the bitstream into a human viewable content (e.g., video data that may be understandable to an average person regardless of image quality, such as the video frames). For example, the processor/logic 824 may receive pure (e.g., raw) data from the image sensor 822 and generate (e.g., encode) video data (e.g., the bitstream) based on the raw data. The capture device 804 may have the memory 826 to store the raw data and/or the processed bitstream. For example, the capture device 804 may implement the frame memory and/or buffer 826 to store (e.g., provide temporary storage and/or cache) one or more of the video frames (e.g., the digital video signal). In some embodiments, the processor/logic 824 may perform analysis and/or correction on the video frames stored in the memory/buffer 826 of the capture device 804.

The sensors 814 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 814 may be configured to detect motion anywhere in the field of view monitored by the camera 800. In various embodiments, the detection of motion may be used as one threshold for activating the capture device 804. The sensors 814 may be implemented as an internal component of the camera 800 and/or as a component external to the camera 800. In an example, the sensors 814 may be implemented as a passive infrared (PIR) sensor. In another example, the sensors 814 may be implemented as a smart motion sensor. In embodiments implementing the smart motion sensor, the sensors 814 may comprise a low resolution image sensor configured to detect motion and/or persons.

In various embodiments, the sensors 814 may generate a signal (e.g., SENS). The signal SENS may comprise a variety of data (or information) collected by the sensors 814. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 802. In an example, the sensors 814 may generate (assert) the signal SENS when motion is detected in the field of view monitored by the camera 800. In another example, the sensors 814 may generate (assert) the signal SENS when triggered by audio in the field of view monitored by the camera 800. In still another example, the sensors 814 may be configured to provide directional information with respect to motion and/or sound detected in the field of view. The directional information may also be communicated to the processor/SoC 802 via the signal SENS.

The processor/SoC 802 may be configured to execute computer readable code and/or process information. In various embodiments, the computer readable code may be stored within the processor/SoC 802 (e.g., microcode, etc.) and/or in the memory 806. In an example, the processor/SoC 802 may be configured to execute one or more artificial neural network models (e.g., facial recognition CNN, object detection CNN, object classification CNN, etc.) stored in the memory 806. In an example, the memory 806 may store one or more directed acyclic graphs (DAGs) and one or more sets of weights defining the one or more artificial neural network models. The processor/SoC 802 may be configured to receive input from and/or present output to the memory 806. The processor/SoC 802 may be configured to present and/or receive other signals (not shown). The number and/or types of inputs and/or outputs of the processor/SoC 802 may be varied according to the design criteria of a particular implementation. The processor/SoC 802 may be configured for low power (e.g., battery) operation.

The processor/SoC 802 may receive the signal RAW VIDEO and the signal SENS. In an example, the processor/SoC 802 may generate one or more video output signals (e.g., RGB, IR, etc.) and one or more control signals (e.g., SL FLAG) based on the signal RAW VIDEO, the signal SENS, and/or other input. In some embodiments, the signals RGB, IR, and SL FLAG may be generated based on analysis of the signal RAW VIDEO and/or objects detected in the signal RAW VIDEO. In an example, the signal RGB generally comprises color images (frames) in either an RGB or YUV color space. In an example, the signal RGB may be generated when the processor/SoC 802 is operating in a day mode. In an example, the signal RGB may be generated when the processor/SoC 802 is operating in a day mode. In an example, the signal IR generally comprises IR monochrome images (frames). In one example, the signal IR may comprise non-contaminated IR images (e.g., no structured light pattern) using ambient IR light when the processor/SoC 802 is operating in a day mode. In another example, the signal IR may comprise non-contaminated IR images (e.g., no structured light pattern) using IR LED illumination when the processor/SoC 802 is operating in a night mode. In yet another example, the signal IR may comprise contaminated IR images (e.g., the structured light pattern is present in at least a portion of the image) when the IR projector is turned on and the processor/SoC 802 is operating in either the day mode or night mode. In various embodiments, the processor/SoC 802 may be configured to perform one or more of feature extraction, object detection, object tracking, and object identification. For example, the processor/SoC 802 may determine motion information and/or depth information by analyzing a frame from the signal RAW VIDEO and comparing the frame to a previous frame. The comparison may be used to perform digital motion estimation. In some embodiments, the processor/SoC 802 may be configured to generate the video output signals RGB and IR comprising video data from the signal RAW VIDEO. The video output signals RGB and IR may be presented to the memory 806, the communications module 816, and/or the wireless interface 818. The signal SL FLAG may be configured to indicate when the structured light pattern is present in the signals RGB and IR. In an example, the image data carried by the signal RGB may be ignored (dropped) when the signal indicates the structured light pattern is present.

The memory 806 may store data. The memory 806 may implement various types of memory including, but not limited to, a cache, flash memory, memory card, random access memory (RAM), dynamic RAM (DRAM) memory, etc. The type and/or size of the memory 806 may be varied according to the design criteria of a particular implementation. The data stored in the memory 806 may correspond to a video file, motion information (e.g., readings from the sensors 814), video fusion parameters, image stabilization parameters, user inputs, computer vision models, and/or metadata information.

The lens 808 (e.g., camera lens) may be directed to provide a view of an environment surrounding the camera 800. The lens 808 may be aimed to capture environmental data (e.g., light). The lens 808 may be wide-angle lenses and/or fish-eye lenses (e.g., lenses capable of capturing a wide field of view). The lens 808 may be configured to capture and/or focus the light for the capture device 804. Generally, the image sensor 822 is located behind the lens 808. Based on the captured light from the lens 808, the capture device 804 may generate a bitstream and/or video data.

The communications module 816 may be configured to implement one or more communications protocols. For example, the communications module 816 and the wireless interface 818 may be configured to implement one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee. In some embodiments, the wireless interface 818 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 800 is implemented as a wireless camera, the protocol implemented by the communications module 816 and wireless interface 818 may be a wireless communications protocol. The type of communications protocols implemented by the communications module 816 may be varied according to the design criteria of a particular implementation.

The communications module 816 and/or the wireless interface 818 may be configured to generate a broadcast signal as an output from the camera 800. The broadcast signal may send the video data RGB and/or IR, and/or the control signal SL FLAG to external devices. For example, the broadcast signal may be sent to a cloud storage service (e.g., a storage service capable of scaling on demand). In some embodiments, the communications module 816 may not transmit data until the processor/SoC 802 has performed video analytics to determine that an object is in the field of view of the camera 800.

In some embodiments, the communications module 816 may be configured to generate a manual control signal. The manual control signal may be generated in response to a signal from a user received by the communications module 816. The manual control signal may be configured to activate the processor/SoC 802. The processor/SoC 802 may be activated in response to the manual control signal regardless of the power state of the camera 800.

In some embodiments, the camera 800 may include a battery 820 configured to provide power for the various components of the camera 800. The multi-step approach to activating and/or disabling the capture device 804 based on the output of the motion sensor 814 and/or any other power consuming features of the camera 800 may be implemented to reduce a power consumption of the camera 800 and extend an operational lifetime of the battery 820. A motion sensor of the sensors 814 may have a very low drain on the battery 820 (e.g., less than 10 µW). In an example, the motion sensor of the sensors 814 may be configured to remain on (e.g., always active) unless disabled in response to feedback from the processor/SoC 802. The video analytics performed by the processor/SoC 802 may have a large drain on the battery 820 (e.g., greater than the motion sensor 814). In an example, the processor/SoC 802 may be in a low-power state (or power-down) until some motion is detected by the motion sensor of the sensors 814.

The camera 800 may be configured to operate using various power states. For example, in the power-down state (e.g., a sleep state, a low-power state) the motion sensor of the sensors 814 and the processor/SoC 802 may be on and other components of the camera 800 (e.g., the image capture device 804, the memory 806, the communications module 816, etc.) may be off. In another example, the camera 800 may operate in an intermediate state. In the intermediate state, the image capture device 804 may be on and the memory 806 and/or the communications module 816 may be off. In yet another example, the camera 800 may operate in a power-on (or high power) state. In the power-on state, the sensors 814, the processor/SoC 802, the capture device 804, the memory 806, and/or the communications module 816 may be on. The camera 800 may consume some power from the battery 820 in the power-down state (e.g., a relatively small and/or minimal amount of power). The camera 800 may consume more power from the battery 820 in the power-on state. The number of power states and/or the components of the camera 800 that are on while the camera 800 operates in each of the power states may be varied according to the design criteria of a particular implementation.

In some embodiments, the camera 800 may include a keypad, a touch pad (or screen), a doorbell switch, and/or other human interface devices (HIDs) 828. In an example, the sensors 814 may be configured to determine when an object is in proximity to the HIDs 828. In an example where the camera 800 is implemented as part of an access control application, the capture device 804 may be turned on to provide images for identifying a person attempting access, and illumination of a lock area, and/or for an access touch pad may be turned on.

In various embodiments, a low cost 3D sensing platform may be provided. The low cost 3D sensing platform may facilitate development of intelligent access control systems and smart security products such as smart video doorbells and door locks, payment systems, alarm systems, etc. In various embodiments, the low cost 3D sensing platform may include a vision system on chip (SoC), structured light projector, and RGB-IR image sensor. In various embodiments, an RGB-IR CMOS image sensor may be utilized to obtain both a visible light image and an infrared (IR) image, for viewing and facial recognition, and also utilize the infrared (IR) image for depth sensing. In an example, the vision SoC may provide depth processing, anti-spoofing algorithms, 3D facial recognition algorithms, and video encoding on a single chip.

In various applications, the low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advance high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) algorithms for advanced features such as people counting and anti-tailgating.

In various embodiments, system cost may be reduced by using an RGB-IR sensor (e.g., one sensor and one lens versus two sensors and two lenses). In some embodiments, system cost may be further reduced by using an RGB-IR rolling shutter sensor (e.g., rolling shutter vs. global shutter). By controlling the structured light projector through software, the time sequence may be adjusted easily, providing improved flexibility. Power savings may be realized because the structured light projector may be used briefly by the software.

In various embodiments, a low cost structured light based 3D sensing system may be implemented. In an example, the 3D information may be used for 3D modeling and liveness determination. In an example, the low cost structured light based 3D sensing system may be used to unlock a door, disarm an alarm system, and/or allow "tripwire" access to a restricted region (e.g., of the garden, the garage, the house, etc.). In one example, the low cost structured light based 3D sensing system may be configured to recognize gardener/pool maintenance person and inhibit triggering an alarm. In another example, the low cost structured light based 3D sensing system may be configured to limit access to certain times and days of the week. In another example, the low cost structured light based 3D sensing system may be configured to trigger an alarm upon recognition of certain objects (e.g. restraining order is out against ex-spouse, alert 911 if that person is detected). In another example, the low cost structured light based 3D sensing system may be configured to allow alarm system re-programming privilege based on video/audio identification (e.g., only person X or Y is permitted to change access level or policy, add users, etc. even if the correct password is entered).

The functions illustrated by the diagrams of FIGS. 1-11 may be implemented utilizing one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface circuit configured to receive pixel data corresponding to a field of view of a camera; and
a control circuit configured to process said pixel data arranged as video frames and (b) control an exposure time for capturing said pixel data and a turn on time of a structured light pattern to obtain a sequence of images comprising at least one image including said structured light pattern and at least one image where said structured light pattern is absent, wherein (a) said control circuit is further configured to perform a depth analysis to generate depth information using the at least one image including said structured light pattern, and (b) said control circuit stores and executes an artificial neural network trained to (i) discern whether a face is at least one of a real face and a fake face, and (ii) make a liveness determination utilizing the depth information.

2. The apparatus according to claim 1, further comprising:
an RGB-IR image sensor, wherein said interface circuit is further configured to control a shutter of said RGB-IR image sensor based on said exposure time for capturing said pixel data.

3. The apparatus according to claim 1, further comprising:
a structured light projector configured to generate said structured light pattern, wherein said interface circuit is further configured to communicate said turn on time to said structured light projector.

4. The apparatus according to claim 3, wherein said structured light projector comprises an array of vertical-cavity surface-emitting lasers.

5. The apparatus according to claim 4, wherein said array of vertical-cavity surface-emitting lasers emit a wavelength in an 800 to 1000 nanometer range.

6. The apparatus according to claim 4, wherein said structured light projector further comprises a lens configured to decompose a laser light pattern from the array of vertical-cavity surface-emitting lasers to a dense dot pattern array.

7. The apparatus according to claim 1, wherein said control circuit is further configured to generate a signal indicating which image in said sequence of images contains said structured light pattern.

8. The apparatus according to claim 1, wherein said sequence of images comprises a plurality of groups, each group comprising one or more images including said structured light pattern and two or more images where said structured light pattern is absent.

9. The apparatus according to claim 1, wherein said control circuit is further configured to control one or more features of a security system in response to said sequence of images and an indication of which image in said sequence of images contains said structured light pattern.

10. The apparatus according to claim 9, wherein the one or more features of said security system comprise one or more of a door lock, an alarm system, a controlled access system, and a payment system.

11. The apparatus according to claim 1, wherein said apparatus comprises a low power camera.

12. The apparatus according to claim 1, wherein the control circuit is further configured to perform facial recognition utilizing the at least one image where said structured light pattern is absent.

13. The apparatus according to claim 1, wherein said control circuit is further configured to perform 3D facial recognition utilizing said depth information.

14. The apparatus according to claim 1, further comprising at least one of an infrared (IR) light source and a visible light source.

15. The apparatus according to claim 14, wherein said IR light source and said visible light source each comprise one or more light emitting diodes.

16. A method of implementing a low-cost structured light based 3D sensing system comprising:
setting an exposure time for capturing pixel data corresponding to a field of view of a camera based on a predetermined value;
controlling an on-time of a structured light pattern;
capturing a sequence of images using said camera, wherein said sequence of images comprises at least one image including said structured light pattern and at least one image where said structured light pattern is absent;
performing a depth analysis to generate depth information using the at least one image including said structured light pattern; and
distinguishing whether a face is at least one of a real face and a fake face, and making a liveness determination utilizing an artificial neural network applied to the depth information.

17. The method according to claim 16, wherein said structured light pattern is generated by a structured light projector and said on-time of said structured light pattern is controlled by a timer.

18. The method according to claim 16, further comprising:
in a daytime mode, using one or more of color image data and infrared image data captured by said camera using an RGB-IR image sensor while said structured light pattern is turned off for one or more of encoding, face detection, and face recognition.

19. The method according to claim 16, further comprising:
in a night mode, using infrared image data captured by said camera using an RGB-IR image sensor while said structured light pattern is turned off for one or more of encoding, face detection, and face recognition.

20. The method according to claim 16, further comprising:
using infrared image data captured by said camera using an RGB-IR image sensor while said structured light pattern is turned on and said depth information to perform 3D face recognition.

* * * * *